United States Patent
Jiang et al.

(10) Patent No.: US 12,407,676 B2
(45) Date of Patent: Sep. 2, 2025

(54) ONLINE DATA IN A SECURE ENVIRONMENT

(71) Applicant: Lemon Inc., Grand Cayman (KY)

(72) Inventors: Shun Jiang, Los Angeles, CA (US);
Sheng Wu, Los Angeles, CA (US);
Jiatian Wang, Los Angeles, CA (US);
Xiaoran Ni, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 107 days.

(21) Appl. No.: 17/748,905

(22) Filed: May 19, 2022

(65) Prior Publication Data

US 2023/0379318 A1    Nov. 23, 2023

(51) Int. Cl.
*G06Q 30/00* (2023.01)
*G06Q 30/0241* (2023.01)
*G06Q 30/0251* (2023.01)
*H04L 9/40* (2022.01)
*G05B 19/418* (2006.01)

(52) U.S. Cl.
CPC ....... *H04L 63/083* (2013.01); *G06Q 30/0255* (2013.01); *G06Q 30/0277* (2013.01); *H04L 63/0823* (2013.01)

(58) Field of Classification Search
CPC .............. H04L 63/083; H04L 63/0823; G06Q 30/0255; G06Q 30/0277; G06Q 30/0269
See application file for complete search history.

(56) References Cited

U.S. PATENT DOCUMENTS

| 5,862,321 A * | 1/1999 | Lamming | ........... G06F 21/6218 |
| | | | 709/200 |
| 2002/0055933 A1* | 5/2002 | Feathers | ................. G06Q 30/02 |
| 2013/0097664 A1* | 4/2013 | Herz | ...................... G06Q 30/02 |
| | | | 726/1 |
| 2014/0188708 A1* | 7/2014 | Govindarajan | ....... H04W 4/023 |
| | | | 705/39 |

(Continued)

OTHER PUBLICATIONS

Lutkevich, tokenization, internet archive way back machine capture date of Dec. 14, 2021 from URL https://www.techtarget.com/searchsecurity/definition/tokenization (Year: 2021).*

(Continued)

*Primary Examiner* — Maria V Vanderhorst
(74) *Attorney, Agent, or Firm* — BakerHostetler (57) ABSTRACT

The present disclosure describes techniques for using online data in a secure environment. A token may be generated based on a user's behavior data. The token may be certified by a data certificate provider. The token may be registered through a decentralized service provided by a broker. The broker may be configured to process advertising requests received from advertisers. The broker may be configured to request for advertisements suggested by at least one independent advisor. The broker may be configured to provide at least one subset of the advertisements to at least one publisher. The token may be transmitted to an independent token manager for storage. An ownership of the token may be claimed when interacting with the at least one publisher. The ownership of the token may be verified after the at least one publisher plays at least one advertisement associated with the token.

12 Claims, 9 Drawing Sheets

(56) References Cited

U.S. PATENT DOCUMENTS

| | | | | |
|---|---|---|---|---|
| 2014/0279556 A1* | 9/2014 | Priebatsch | ............ | G06Q 20/385 |
| | | | | 705/67 |
| 2015/0081566 A1* | 3/2015 | Slepinin | ............. | G06Q 20/3829 |
| | | | | 705/69 |
| 2016/0142380 A1* | 5/2016 | Fuller | .................... | G06Q 30/02 |
| | | | | 726/9 |
| 2018/0129955 A1* | 5/2018 | Saxena | .................. | G06N 20/00 |
| 2019/0164137 A1* | 5/2019 | Vincent | ................. | H04L 9/0643 |
| 2019/0166094 A1* | 5/2019 | Weatherill | ........... | H04L 63/0236 |
| 2019/0370866 A1* | 12/2019 | Lawbaugh | ......... | G06Q 30/0269 |
| 2020/0082106 A1* | 3/2020 | Fox | ........................ | H04L 63/101 |
| 2020/0302482 A1* | 9/2020 | Shakespeare | ......... | H04W 12/08 |
| 2021/0182915 A1* | 6/2021 | Blaikie, III | ........... | G06Q 20/145 |
| 2021/0211289 A1* | 7/2021 | Lin | ........................ | H04L 9/3213 |
| 2021/0319436 A1* | 10/2021 | Ow | ...................... | G06Q 20/0658 |
| 2021/0390196 A1* | 12/2021 | Lavine | .................. | G06F 21/604 |
| 2022/0108347 A1* | 4/2022 | Connell | ............. | G06Q 20/3224 |
| 2022/0292547 A1* | 9/2022 | Peurifoy | ................. | H04L 51/52 |
| 2022/0368541 A1* | 11/2022 | Palatov | ..................... | H04L 9/50 |
| 2023/0075767 A1* | 3/2023 | Bradley | ................. | G16B 30/00 |

OTHER PUBLICATIONS

"ObliviAd: Provably Secure and Practical Online Behavioral Advertising". IEEE. 2013. (Year: 2013).*

* cited by examiner

ONLINE DATA IN A SECURE ENVIRONMENT

BACKGROUND

Consumer data is increasingly being utilized for various purposes. For example, consumer data may be utilized to determine or select advertisements. As the quantity of consumer data utilized for various purposes continue to grow, consumers desire to maintain control over their own data.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Many existing entities that provide services, such as online services, to users also collect data associated with those users when they provide services to them. Such entities may transform this valuable end-user data into revenue in the global advertisement market. For example, some entities may sell the end-user data to one or more parties in the global advertisement market. These parties may use the end-user data to determine or select advertisements for certain users or groups of users. Some entities may create centralized data repositories that store the collected end-user data and may provide accurate advertisement distribution based on analysis of the stored data. Such entities may serve as the "middle-man" that connect advertisers with advertisement publishers.

Some existing platforms propose removing such entities as the "middle-men" in the current global advertisement market. For example, some existing platforms may allow advertisers and ad publishers to deals with each other directly. However, such existing platforms push user data collection and processing out of the platform architecture. Pushing the user data collection and processing out of the platform architecture itself results in an inefficient solution that does not efficiently distribute advertisements to the right audience, such as due to lack of user data. Another downside to such existing platforms is that the users are not able to share any revenue generated from such platforms in the advertisement market. Additionally, the end users who contribute their data do not have control over the ownership of their personal data.

Thus, improved techniques for secure online data usage are desirable. Described herein are improved techniques for using and controlling online data in a secure environment. Such techniques may utilize a decentralized broker to facilitate secure usage and control of user data in the advertisement market.

Figure 1:
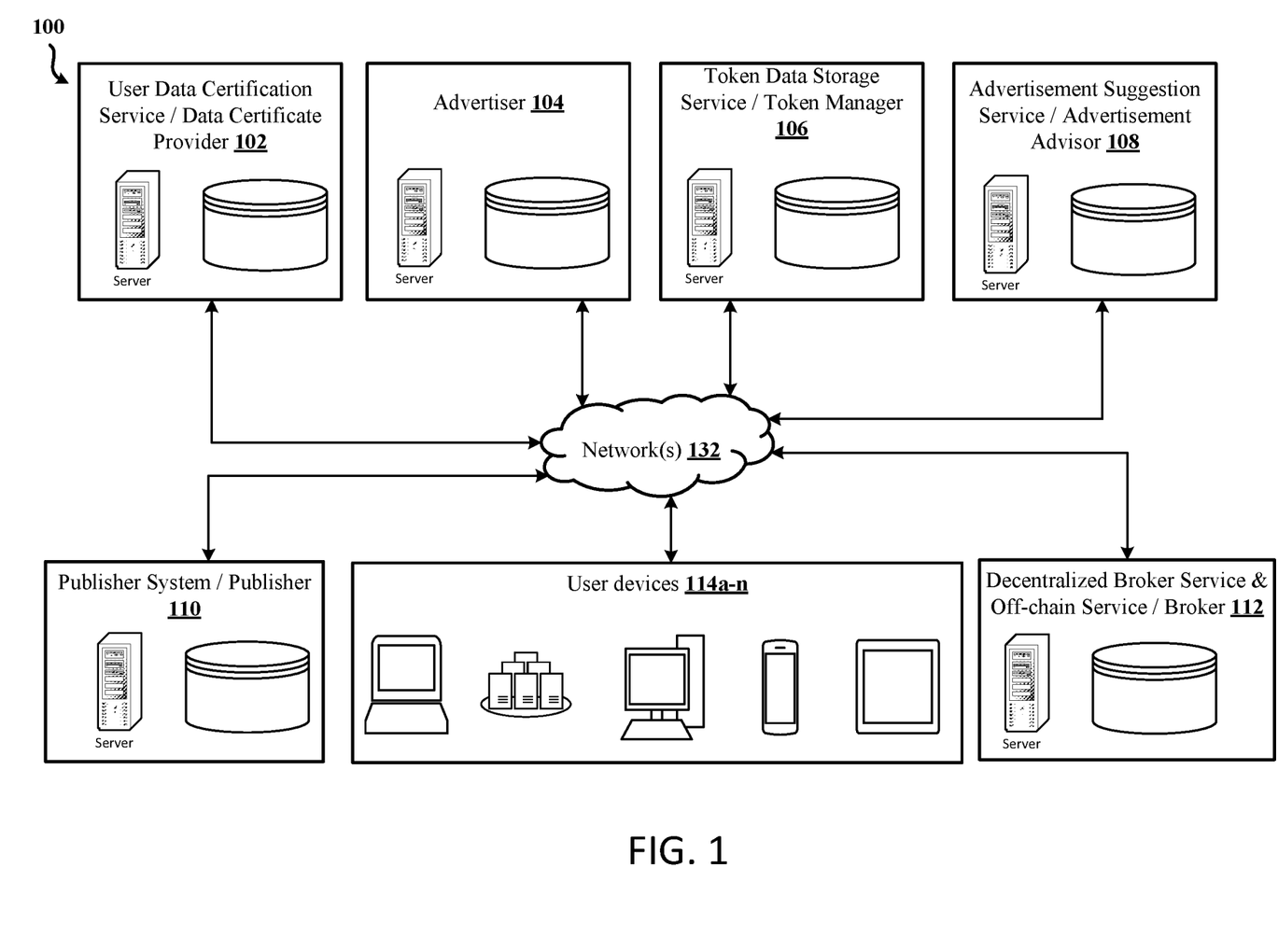
FIG. 1 shows an example system for secure online data usage in accordance with the present disclosure.

The improved techniques for secure online data usage described herein may be utilized by a system, such as the system 100 shown in FIG. 1. FIG. 1 illustrates an example system 100 for secure online data usage. The system 100 may comprise user data certification service provided by data certificate provider(s) 102, advertiser(s) 104, token data storage service provided by token manager(s) 106, advertisement suggestion service provided by advertisement advisor(s) 108, publisher service provide by publisher(s) 110, a plurality of user devices 114a-n, and broker(s) 112 configured to provide a decentralized broker service for end users to secure the usage process and an off-chain centralized service for complementary functions.

The data certificate provider(s) 102, the advertiser(s) 104, the token manager(s) 106, the advertisement advisor(s) 108, the publisher(s) 110, the plurality of user devices 114a-n, and the broker(s) 112 may communicate via one or more networks 132. The network(s) 132 may comprise a variety of network devices, such as routers, switches, multiplexers, hubs, modems, bridges, repeaters, firewalls, proxy devices, and/or the like. The network(s) 132 may comprise physical links, such as coaxial cable links, twisted pair cable links, fiber optic links, a combination thereof, and/or the like. The network(s) 132 may comprise wireless links, such as cellular links, satellite links, Wi-Fi links and/or the like.

In embodiments, the data certificate provider(s) 102 are configured provide a verifiable authentication certificate from data source(s) of a user's behavior data. The data source(s) may include, for example, one or more websites, applications, or platforms. The user may utilize the data source(s) to perform various behaviors, such as to browse, shop, consume content (i.e., videos, images, movies, television shows, etc.), play games, read, communicate with other users, etc. The verifiable authentication certificate associated with a particular data source may verify the user's behavior of using that particular data source. For example, if the user utilizes a data source to shop for an item of makeup, the verifiable authentication certificate may verify that the user bought the item of makeup, the price of the makeup item, a time at which the makeup item was purchased, and any other information associated with the user's behavior while using that particular data source.

In embodiments, the advertiser(s) 104 may want to deliver advertisements to targeted users and bring in corresponding incentives. For example, the advertiser(s) 104 may create advertisements. They may want to place their advertisements where the target audience is likely to see them. For example, the advertiser(s) 104 may want to place their advertisements on a website, application, or platform where the target audience is likely to see them. The advertiser(s) 104 may submit advertising requests. Each of the advertising requests may comprise information indicative of a predefined target user group (i.e., the target audience) and an amount of digital currency for payment.

In embodiments, the plurality of user devices 114a-n may be associated with users who want to control usage of their personal online behavior data. For example, the plurality of user devices 114a-n may be associated with users who utilize the data source(s) described above to perform various behaviors, such as to browse, shop, consume content (i.e., videos, images, movies, television shows, etc.), play games, read, communicate with other users, etc. The users may want to control the data collected from these data sources regarding their personal online behavior. For example, the users may want to receive payment for use of such data by other players in the system 100. To do so, the plurality of user devices 114a-n may generate token(s) from their behavior data using the verifiable authentication certificate provided by the data certificate provider(s) 102. Such tokens are discussed below in more detail with regard to FIG. 2.

In embodiments, the token manager(s) 106 (i.e., independent token managers) are configured to provide a secure storage and/or query service for the tokenized end user data. For example, the token manager(s) 106 are configured to provide a secure storage and/or query service for token(s) generated by the plurality of user devices 114a-n. Additionally, the token manager(s) 106 may be configured to provide anonymous tokenized user data to the advertisement advisor(s) 108.

In embodiments, the advertisement advisor(s) 108 (i.e., independent advisors) are configured to answer real-time queries as to which advertisements should be played to end users. To answer such queries, the advertisement advisor(s) 108 may leverage the anonymous user data provided from the token manager(s) 106. The advertisement advisor(s) 108 may, for example, be registered to be associated with the token(s) generated based on users' behavior data. The advertisement advisor(s) 108 may be configured to obtain the token(s) from the token manager(s) 106 and train one or more advertisement suggestion systems or models using the token(s). The advertisement advisor(s) 108 may be configured to monitor transactions associated with the token(s). There may be multiple advertisement advisor(s) 108 as competitors.

In embodiments, the publisher(s) 110 are configured to provide interactive services to end users (e.g., users associated with the plurality of user devices 114a-n) and deliver advertisements to the end users while providing the interactive services. The delivered advertisements may include, for example, advertisements suggested by the advertisement advisor(s) 108 in response to real-time advertisement queries.

In embodiments, the broker(s) 112 are configured to provide a decentralized service for end users to secure the data usage process and an off-chain centralized service for complementary functions. The broker(s) 112 may be configured to process advertising requests received from the advertiser(s) 104. The broker(s) 112 may be configured to request the advertisement advisor(s) 108 to suggest advertisements for playing. The broker(s) 112 may be configured to provide at least one suggested advertisement to the publisher(s) 110 for display to the end users. The plurality of user devices 114a-n may register token(s) with the broker(s) 112. For example, the plurality of user devices 114a-n may register toke(s) using private key(s) and without revealing details of the token to the broker(s) 112.

Figure 2:
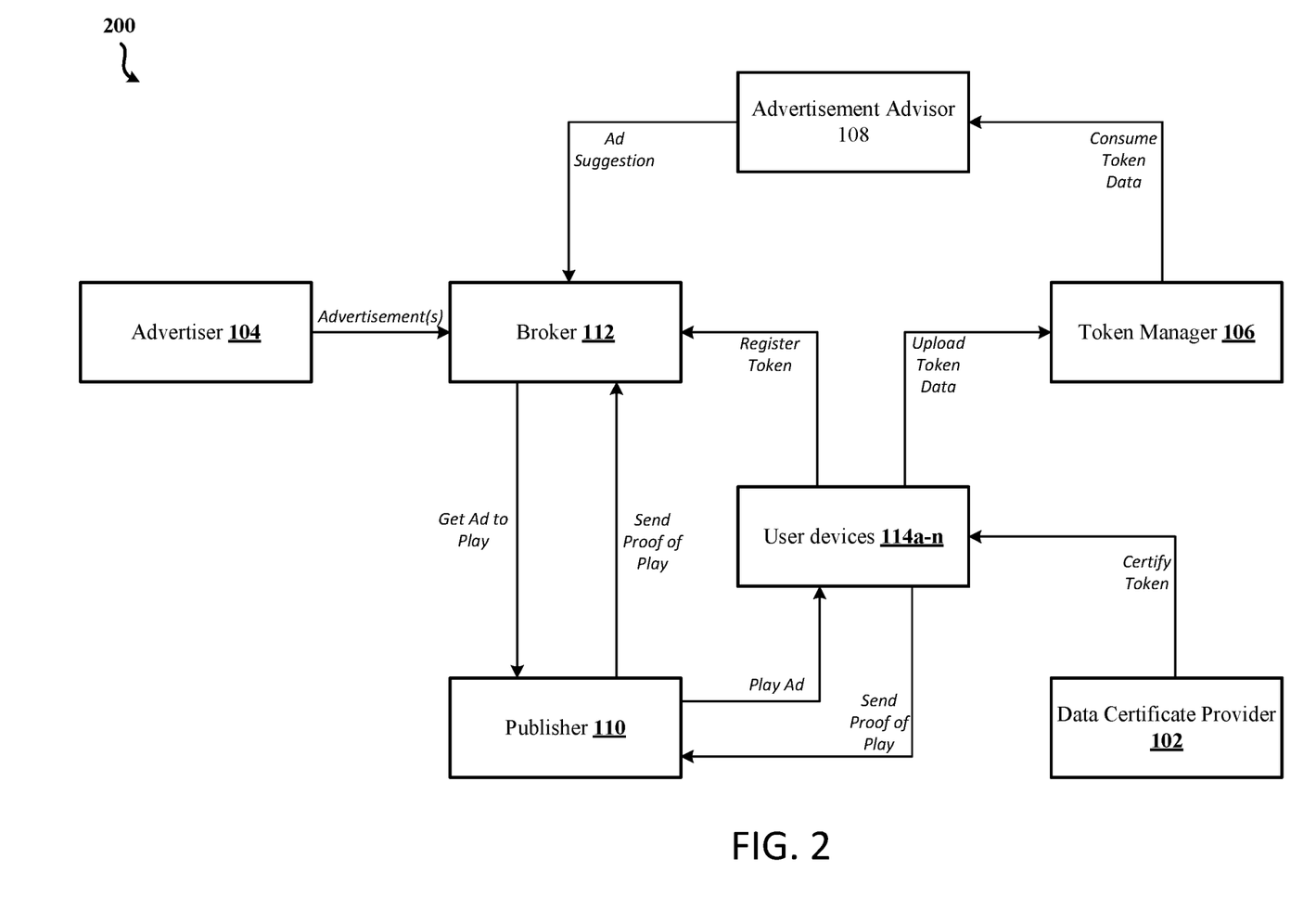
FIG. 2 shows an example framework for secure online data usage in accordance with the present disclosure.

FIG. 2 illustrates an example framework 200 for secure online data usage. The framework 200 includes data certificate provider(s) 102, advertiser(s) 104, token manager(s) 106, advertisement advisor(s) 108, publisher(s) 110, a plurality of user devices 114a-n, and broker(s) 112.

A user device 114 may generate a token based on user behavior data with a verifiable authentication certificate of the user's behavior data. As described above, the verifiable authentication certificate may be provided by the data certificate provider(s) 102 to the user device. The user behavior data may be pre-processed through a data obfuscation process. The data obfuscation process may hide partial information through removal and categorization. For example, the data obfuscation process may remove or categorize certain user data, remove a shopping item vendor, categorize a shopping item into one or more pre-defined categories, categorize the price of each shopping item, etc. The token may comprise information associated with the data obfuscation process. A value of the token may be determined based at least in part on the data obfuscation process. A token comprising the user data may be generated with the verifiable authentication certificate as a proof of authentication.

The user device 114 may register the token to the broker(s) 112 through a decentralized broker service provided by the broker(s) 112. For example, the user device may create a transaction through an application binary interface (ABI) of a token registration smart contract deployed on a blockchain provided by the broker(s) 112 with a selected token manager account as input. The user device may also, when registering the token, provide a blockchain account address to receive future income and as a proof of ownership of the token. Only a hash key of the token may be used to register the token. No details of the token data need to be revealed to the broker(s) 112. A token registry may be created based on registering the token. The token registry as a smart contract may define how income will be distributed when generated to the participants, including the user device 114, the broker(s) 112, the token manager(s) 106, the advertisement advisor(s) 108, and/or the publisher(s) 110.

The user device 114 may store the token data to the selected token manager(s) 106 and associate the token data with a token manager account. The user device 114 may present the token registration transaction to the selected token manager(s) 106 as evidence of income distribution so that the selected token manager(s) 106 can have a share of the income in exchange for providing a storage service. The selected token manager(s) 106 may call the ABI of the token registration to confirm the agreement of providing the data storage service.

The advertisement advisor(s) 108 may monitor the transactions of the token registration smart contract confirmed by the selected token storage 106. The advertisement advisor(s) 108 may register themselves as advertisement advisors for the user token. Multiple advertisement advisor(s) 108 can be registered as advertisement advisors for a single user token. Once the advertisement advisor 108 is registered as an advertisement advisor for a token, that advertisement advisor 108 may be allowed to pull data from the selected token manager(s) 106 to train their system(s) or model(s) (e.g., machine learning models) to suggest advertisements.

The advertiser(s) 104 may request placement of an advertisement with a predefined target user group. The advertiser(s) 104 may indicate the advertisement information and an amount of digital currency for payment by creating a transaction through the application ABI of a token registration smart contract deployed on a blockchain provided by the broker(s) 112. The payment through the smart contract may be limited to be only transferable to the type of proof of play smart contract created from a token registration smart contract.

The user devices 114a-n may claim, without proof, that they are the owner of certain tokens when interacting with the publisher(s) 110 having an advertisement play feature. When the publisher(s) 110 try to play advertisement(s), they may request advertisement(s) to play from the broker(s) 112. The broker(s) 112 may request advertisement(s) from the advertisement advisor(s) 108 for advertisement play offers. The broker(s) 112 may select one or more advertisements from the suggested advertisements as a response to advertisement request from the publisher(s) 110

When the publisher(s) 110 finish the play of the advertisement, a proof will be collected from the user device 114 that claims to be the data token owner. If the user device 114 that claims to be the data token owner is the real owner, the user device 114 may be able to use a private key of the user device 114 to verify the ownership of the data token. This verification may be taken as a proof of an advertisement play.

The publisher(s) 110 may collect the proof of play from the user device 114. The publisher(s) 110 may call the ABI of the token registration smart contract to create a derived advertisement play proof smart contract to record the proof and the participant accounts to receive income. After the advertisement (ad) campaign has expired, the digital currency provided through the advertising smart contract will be separated and transferred to each of the participants of the advertisement play proof smart contract according to pre-defined rules.

Figure 3:
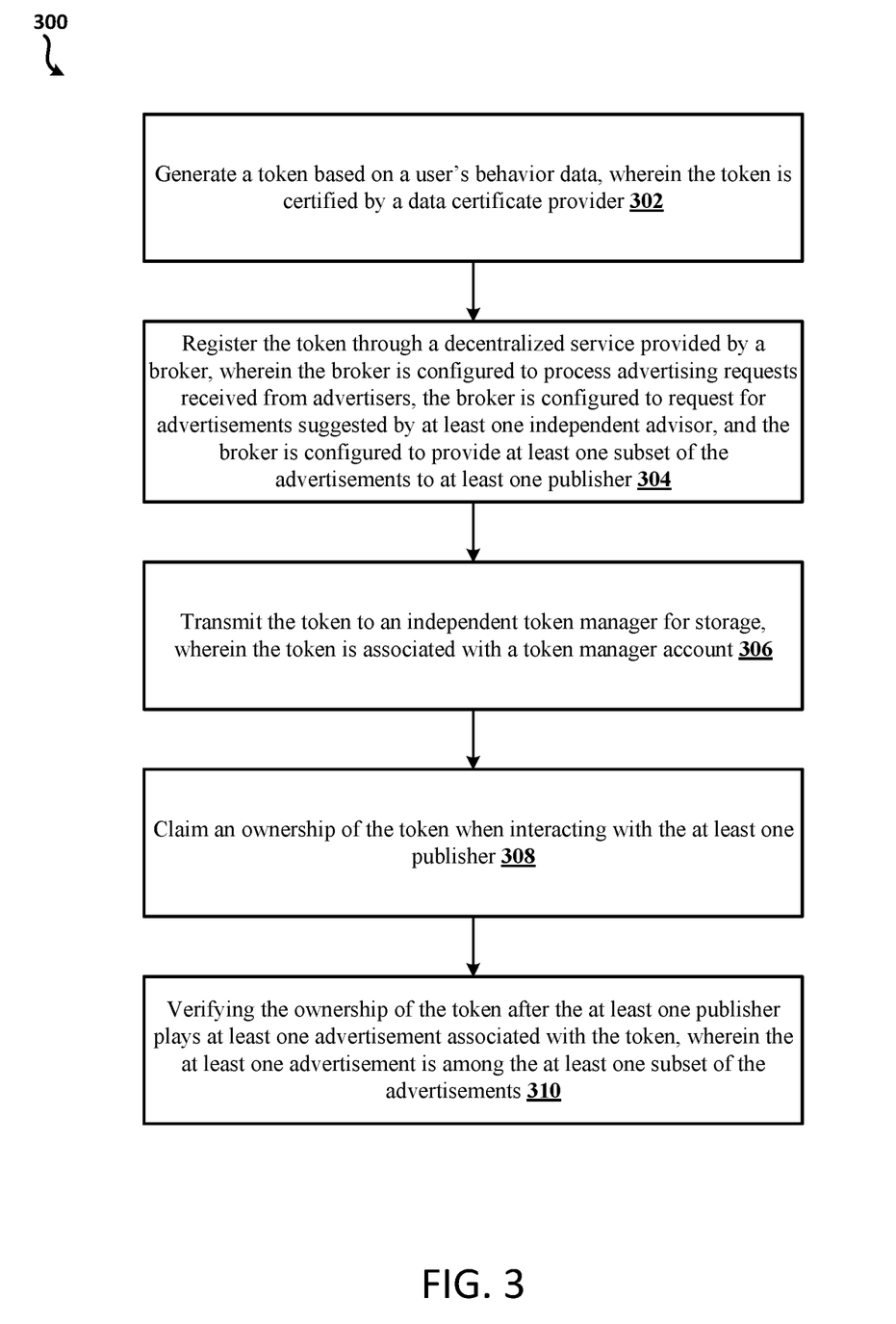
FIG. 3 shows an example process of secure online data usage, which may be performed in accordance with the present disclosure.

FIG. 3 illustrates an example process 300 that may be performed by a user device (e.g., the user device 114). The user device may perform the process 300 to implement secure online data usage and control. Although depicted as a sequence of operations in FIG. 3, those of ordinary skill in the art will appreciate that various embodiments may add, remove, reorder, or modify the depicted operations.

At 302, a token based on a user's behavior data may be generated. The token may be certified by a data certificate provider. For example, a user device may generate a token from a user's behavior data with a verifiable authentication certificate of the user's behavior data. As described above, the verifiable authentication certificate may be provided from data certificate provider (e.g., the data certificate provider 102) to the user device (e.g., the user device 114). At 304, the token may be registered through a decentralized service provided by a broker (e.g., the broker 112). The broker may be configured to process advertising requests received from advertisers. The broker may be configured to request for advertisements suggested by at least one independent advisor (e.g., the advertisement advisor 108). The broker may be configured to provide at least one subset of the advertisements to at least one publisher (e.g., the publisher 110).

At 306, the token may be transmitted to an independent token manager for storage. The token may be associated with a token manager account. For example, the user device (e.g., the user device 114) may store the token data to an independent token manager (e.g., the token manager 106). The token is associated with a token manager account. The user device may present the token registration transaction to the selected token manager as evidence of income distribution so that the selected token manager can have a share of the income in exchange for providing a storage service. The selected token manager may call the ABI of the token registration to confirm the agreement of providing the data storage service.

At 308, an ownership of the token may be claimed when interacting with the at least one publisher. For example, the user device (e.g., the user device 114) associated with a user may claim, without proof, that the user is the owner of the token when interacting with at least one publisher (e.g., the publisher 110) having an advertisement play feature. When the at least one publisher try to play advertisement(s), it may request advertisement(s) to play from a broker (e.g., the broker 112). The broker may request advertisements from at least one independent advisor (e.g., the advertisement advisor 108) for advertisement play offers. The broker may select one or more advertisements from the suggested advertisements as a response to an advertisement request from the at least one publisher.

At 310, the ownership of the token may be verified after the at least one publisher plays at least one advertisement associated with the token. The at least one advertisement may be among the at least one subset of the advertisements. For example, when a publisher (e.g., the publisher 110) finishes the play of the advertisement, a proof will be collected from the user device (e.g., the user device 114) that claims to be the data token owner. If the user associated with the user device that claims to be the data token owner is the real owner, the user device is able to use a private key to verify the ownership of the data token. This verification may be taken as a proof of an advertisement play. The publisher may collect the proof of play from the user device and may call the ABI of the token registration smart contract to create a derived advertisement play proof smart contract to record the proof and the participants accounts to receive income. After the ad campaign has expired, the digital currency provided through the advertising smart contract will be separated and transferred to each of the participants of the advertisement play proof smart contract, including the user device, according to predefined rules.

Figure 4A:
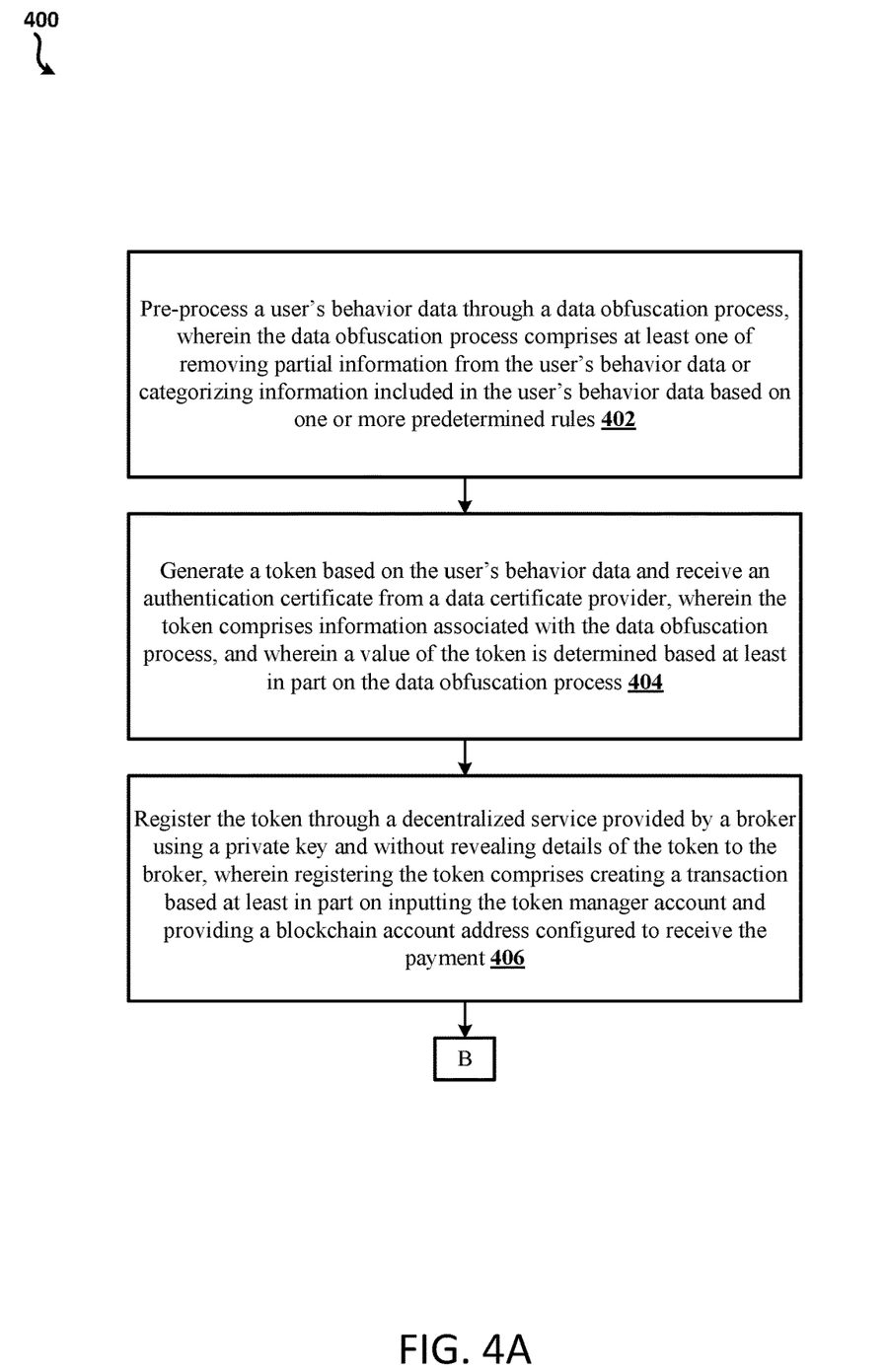
FIGS. 4A-4B show another example process of secure online data usage, which may be performed in accordance with the present disclosure.
Figure 4B:
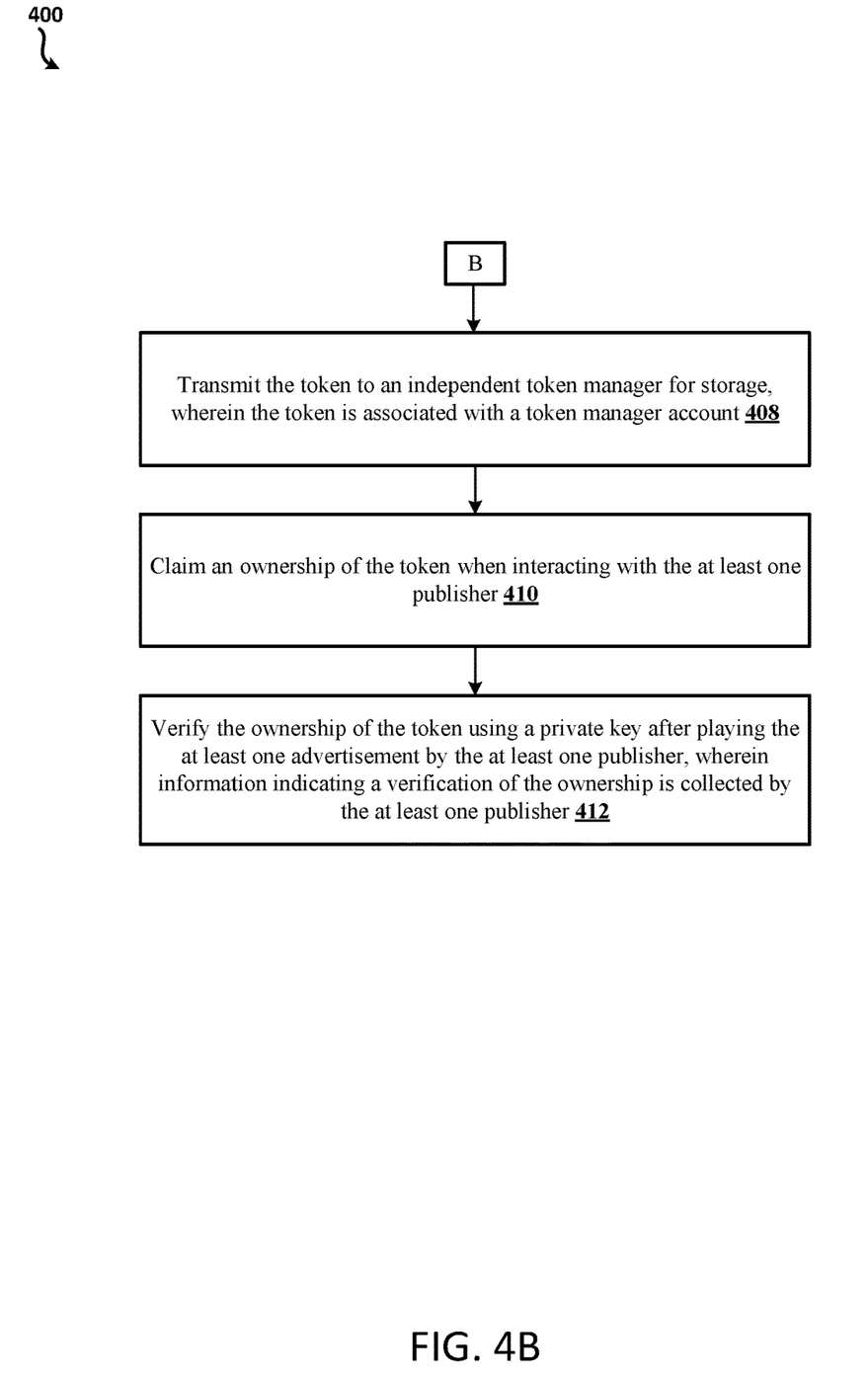

FIG. 4A and FIG. 4B illustrates an example process 400 that may be performed by a user device (e.g., the user device 114). The user device may perform the process 400 to implement secure online data usage. Although depicted as a sequence of operations in FIGS. 4A-4B, those of ordinary skill in the art will appreciate that various embodiments may add, remove, reorder, or modify the depicted operations.

At 402, a user's behavior data may be pre-processed through a data obfuscation process. The data obfuscation process may comprise at least one of removing partial information from the user's behavior data or categorizing information included in the user's behavior data based on one or more predetermined rules. For example, the data obfuscation process may remove or categorize certain user data, remove a shopping item vendor, categorize a shopping item into one or more pre-defined categories, categorize the price of each shopping item, etc.

A token may comprise information associated with the data obfuscation process. For example, a value of the token may be determined based at least in part on the data obfuscation process. At 404, a token based on a user's behavior data may be generated. The token may be certified by a data certificate provider. For example, a user device may generate a token from their behavior data with a verifiable authentication certificate of the user's behavior data. As described above, the verifiable authentication certificate may be provided from a data certificate provider (e.g., the data certificate provider 102) to the user device (e.g., the user device 114).

At 406, the token may be registered through a decentralized service provided by a broker using a private key and without revealing details of the token to the broker. For example, the user device (e.g., the user device 114) may register the token to a broker (e.g., the broker 112) through a decentralized broker service provided by the broker. For example, to register the token, the user device may create a transaction through the application binary interface (ABI) of a token registration smart contract deployed on a blockchain provided by the broker with an associated token manager account as input. The user device may also, when registering the token, provide a blockchain account address to receive future income and as a proof of ownership of the token. Only a hash key of the token may be used to register the token. No details of the token data need to be revealed to broker(s). A token registry may be created based on registering the token. The token registry as a smart contract may define how income will be distributed among the participants, including the user device associated with a user, the broker, the token manager, the advertisement advisor, and/or the publisher.

At 408, the token may be transmitted to an independent token manager for storage. The token may be associated with a token manager account. For example, the user device (e.g., the user device 114) may store the token data to an independent token manager (e.g., the token manager 106) and associate the token with a token manager account. The user device may present the token registration transaction to a selected token manager (e.g., the token manager 106) as evidence of income distribution so that the selected token manager can have a share of the income in exchange for providing a storage service. The selected token manager may call the ABI of the token registration to confirm the agreement of providing the data storage service.

At 410, an ownership of the token may be claimed when interacting with the at least one publisher. For example, the user device associated with a user may claim, without proof, that the user is the owner of the token when interacting with the at least one publisher (e.g., the publisher 110) having an advertisement play feature. When the at least one publisher tries to play advertisement(s), it may request advertisement(s) to play from the broker (e.g., the broker 112). The broker may request advertisements from at least one independent advisor (e.g., the advertisement advisor 108) for advertisement play offers. The broker may select one or more advertisements from the suggested advertisements as a response to an advertisement request from the at least one publisher.

When the at least one publisher (e.g., the publisher 110) finishes playing an advertisement, a proof will be collected from the user device (e.g., the user device 114) that claims to be the data token owner. If the user associated with the user device that claims to be the data token owner is the real owner, the user device may be able to use a private key to verify the ownership of the data token. At 412, the ownership of the token may be verified using a private key after playing the at least one advertisement by the at least one publisher. Information indicating a verification of the ownership may be collected by the at least one publisher. This verification may be taken as a proof of an advertisement play.

The at least one publisher (e.g., the publisher 110) may collect the proof of play from the user device (e.g., the user device 114). The at least one publisher may call the ABI of the token registration smart contract to create a derived advertisement play proof smart contract to record the proof and the participant's accounts to receive income. After the ad campaign has expired, the digital currency provided through the advertising smart contract will be separated and transferred to each of the participants of the advertisement play proof smart contract according to predefined rules.

Figure 5:
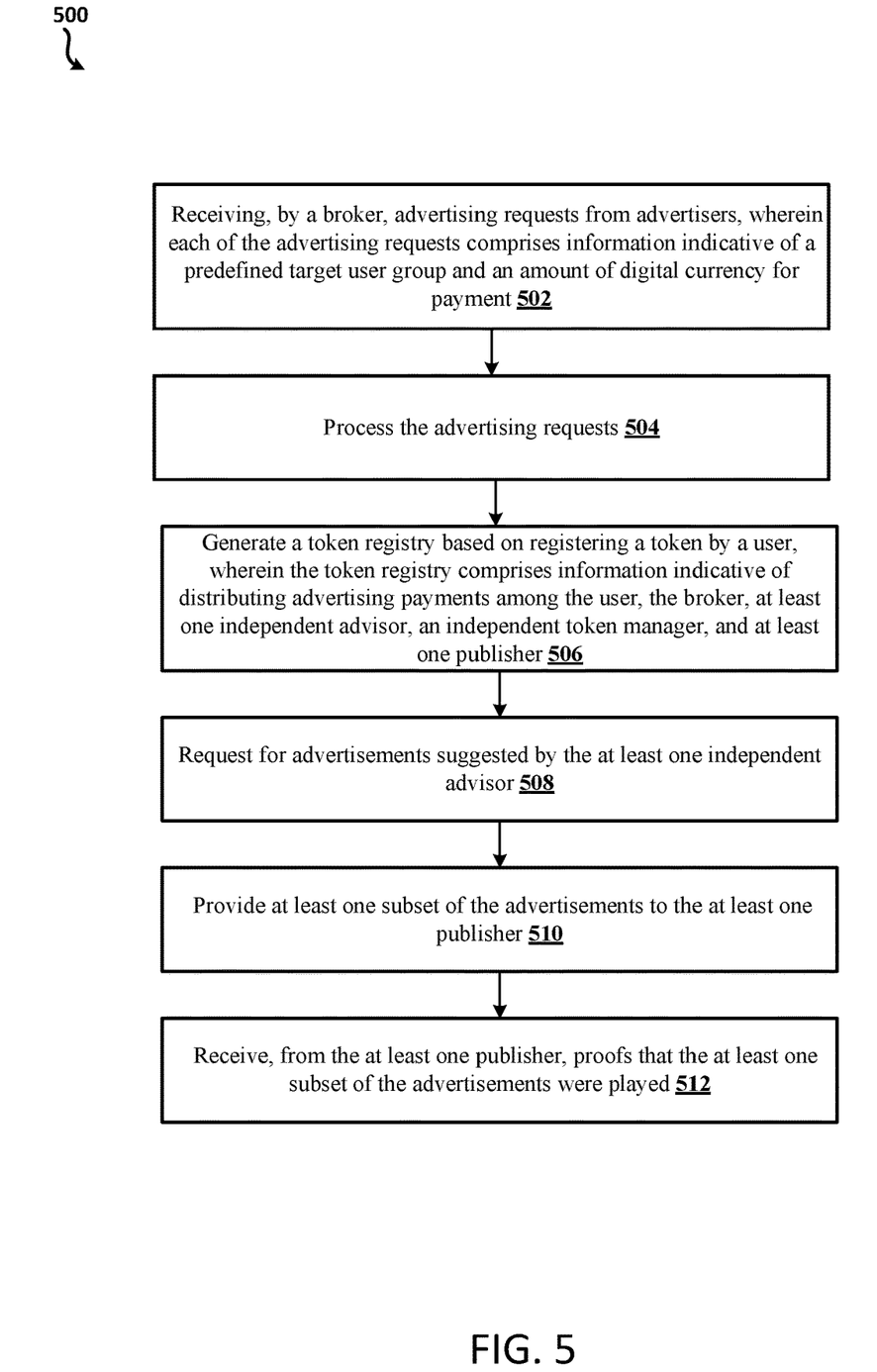
FIG. 5 shows another example process of secure online data usage, which may be performed in accordance with the present disclosure.

FIG. 5 illustrates an example process 500 that may be performed by a broker (e.g., the brokers 112). The broker may perform the process 500 to implement secure online data usage. Although depicted as a sequence of operations in FIG. 5, those of ordinary skill in the art will appreciate that various embodiments may add, remove, reorder, or modify the depicted operations.

Advertiser(s) may submit advertising requests. Each of the advertising requests may comprise information indicative of a predefined target user group (i.e., the target audience) and an amount of digital currency for payment. At 502, advertising requests may be received from advertisers (e.g., the advertisers 104) by a broker (e.g., the broker 112). The broker may be configured to provide a decentralized service for end users to secure the data usage process and an off-chain centralized service for complementary functions. Each of the advertising requests may comprise information indicative of a predefined target user group and an amount of digital currency for payment.

The broker (e.g., the broker 112) may be configured to process the advertising requests received from the advertisers (e.g., the advertisers 104). At 504, the advertising requests may be processed. A token registry may be created based on registering the token. At 506, a token registry may be generated based on registering a token by a user. The token registry as a smart contract may define how advertisement income will be distributed among the participants, including the user associated with the user device (e.g., the user device 114), the broker (e.g., the broker 112), the data certificate provide (e.g., the data certificate provider 102), the independent token manager (e.g., the token manager 106), the at least one independent advisor (e.g., the advertisement advisor 108), and the at least one publisher (e.g., the publisher 110).

The broker (e.g., the broker 112) may be configured to request for suggested advertisements from at least one independent advisor (e.g., the advertisement advisor 108). At 508, advertisements suggested by at least one independent advisor may be requested. The broker may be configured to provide at least one suggested advertisement to at least one publisher for display to the end users. At 510, at least one subset of the advertisements suggested by the at least one independent advisor may be provided to the at least one publisher for playing. The at least one publisher may display the at least one subset of the advertisements to the target users.

The at least one publisher (e.g., the publisher 110) may collect the proof of play from the user device (e.g., the user device 114). The at least one publisher may call the ABI of the token registration smart contract to create a derived advertisement play proof smart contract to record the proof and the participants' accounts to receive income. The broker may receive the proof of play from the at least one publisher. At 512, proofs that the at least one subset of the advertisements were played may be received from the at least one publisher.

Figure 6:
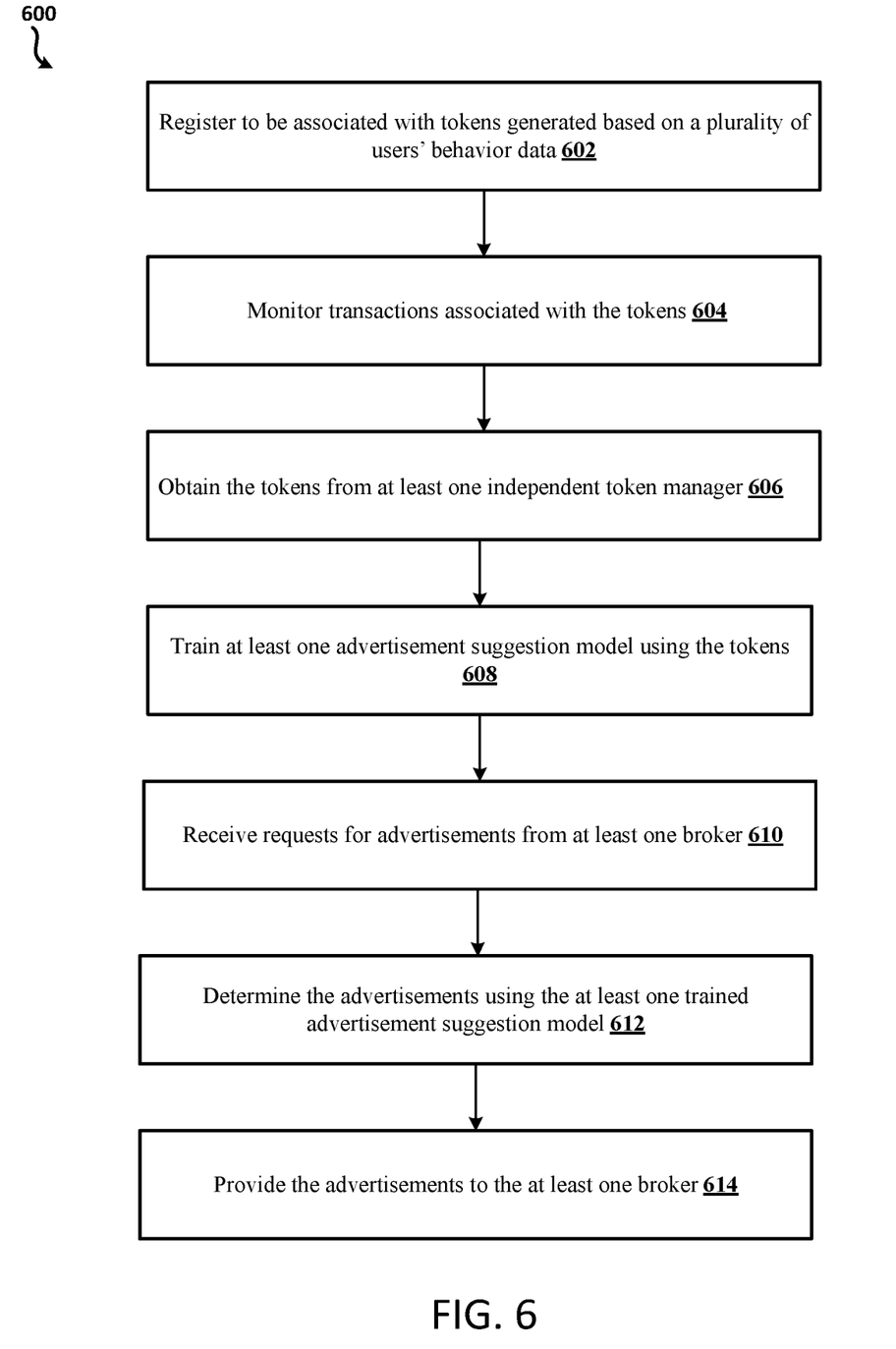
FIG. 6 shows another example process of secure online data usage, which may be performed in accordance with the present disclosure.

FIG. 6 illustrates an example process 600 that may be performed by at least one independent advisor (e.g., the advertisement advisor 108). The advertisement advisor may perform the process 600 to implement secure online data usage. Although depicted as a sequence of operations in FIG. 6, those of ordinary skill in the art will appreciate that various embodiments may add, remove, reorder, or modify the depicted operations.

At 602, at least one independent advisor may register to be associated with tokens generated based on a plurality of users' behavior data. The at least one independent advisor (e.g., the advertisement advisor 108) may, for example, be registered to be associated with the token(s) generated based on the plurality of users' behavior data. At 604, the at least one independent advisor may be configured to monitor transactions associated with the tokens.

The at least one independent advisor (e.g., the advertisement advisor 108) may be configured to obtain the tokens from an independent token manager (e.g., the token manager 106) and train one or more advertisement suggestion systems or models using the tokens. At 606, the tokens may be obtained from at least one independent token manager (e.g., the token manager 106). At 608, at least one advertisement suggestion model may be trained using the tokens obtained from the at least one independent token manager. The at least one trained advertisement suggestion model is capable of determining suitable advertisements for play.

The at least one independent advisor (e.g., the advertisement advisor 108) may be configured to answer real-time queries as to which advertisements should be played to end users. At 610, requests for advertisements may be received from at least one broker (e.g., the broker 112). The at least one independent advisor (e.g., the advertisement advisor 108) may utilize a trained model to suggest advertisements for play. At 612, the advertisements may be determined using the at least one trained advertisement suggestion model. At 614, the advertisements may be provided to the at least one broker. The at least one broker may then provide at least one subset of the advertisements to the at least one publisher (e.g., the publisher 110) for display to the end-users.

Figure 7:
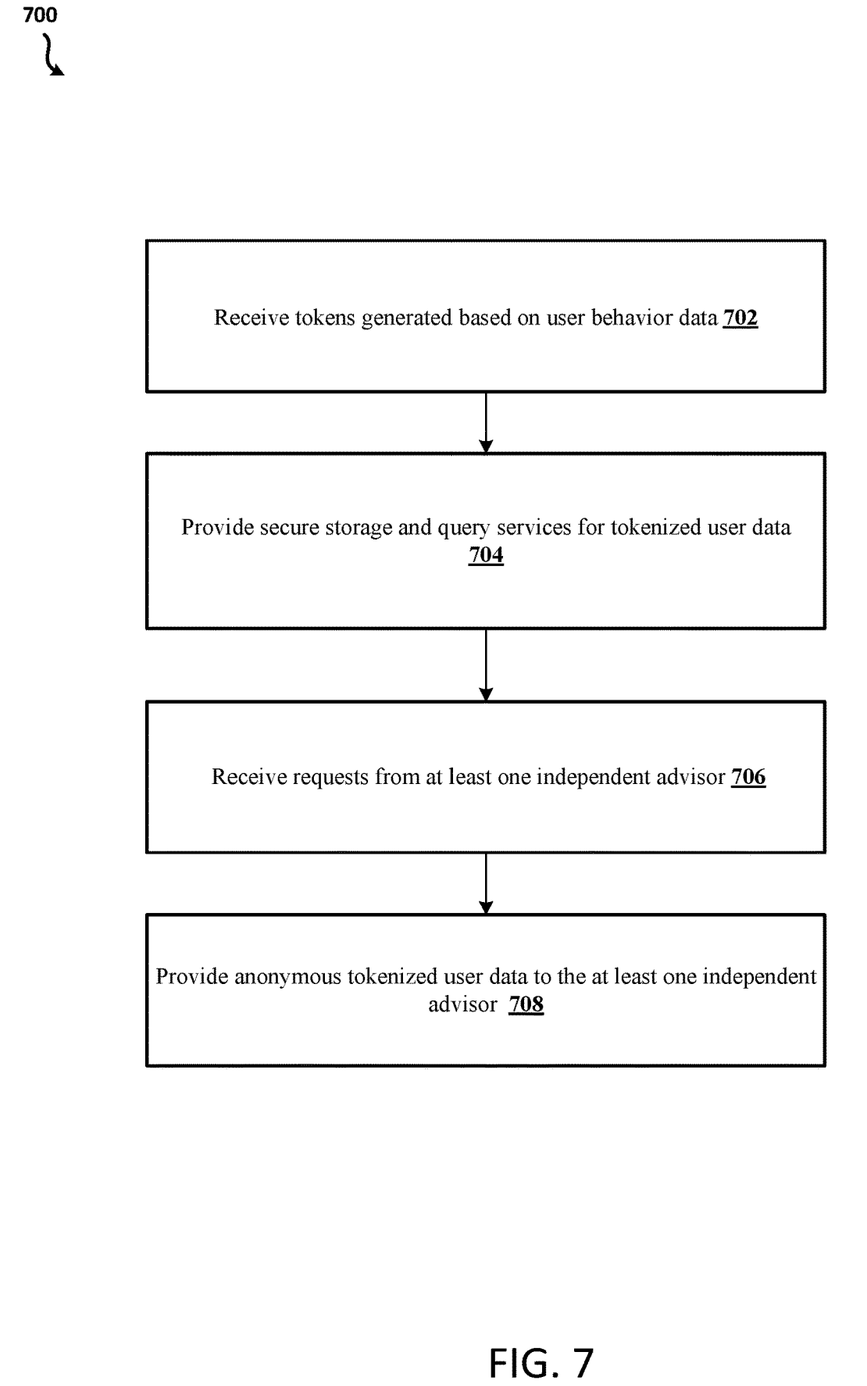
FIG. 7 shows another example process of secure online data usage, which may be performed in accordance with the present disclosure.

FIG. 7 illustrates an example process 700 that may be performed by at least one independent token manager (e.g., the token manager 106). The at least one independent token manager may perform the process 700 to implement secure online data usage. Although depicted as a sequence of operations in FIG. 7, those of ordinary skill in the art will appreciate that various embodiments may add, remove, reorder, or modify the depicted operations.

Tokens based on user behavior data may be generated. The tokens may be certified by data certificate providers (e.g., the data certificate provider 102). For example, user devices (e.g., the user devices 114) may generate tokens based on user behavior data with verifiable authentication certificates of the user behavior data. As described above, the verifiable authentication certificates may be provided from the data certificate providers (e.g., the data certificate providers 102) to the user devices (e.g., the user devices 114). At 702, tokens generated based on user behavior data may be received by at least one independent token manager (e.g., the token manager 106).

The at least one independent token manager (e.g., the token manager 106) may be configured to provide secure storage and query services for tokenized user data. At 704, secure storage and query services may be provided for tokenized user data. At 706, requests may be received from at least one independent advisor (e.g., the advertisement advisor 108). The at least one independent advisor may request for token data from the at least one independent token manager. The at least one independent advisor may train one or more advertisement suggestion systems or models using the token data. The at least one independent advisor may answer real-time queries as to which advertisements should be played to end users using the trained advertisement suggestion systems or models. The at least one independent advisor may be configured to monitor transactions associated with the token data. At 708, anonymous tokenized user data may be provided to the at least one independent advisor by the at least one independent token manager.

Figure 8:
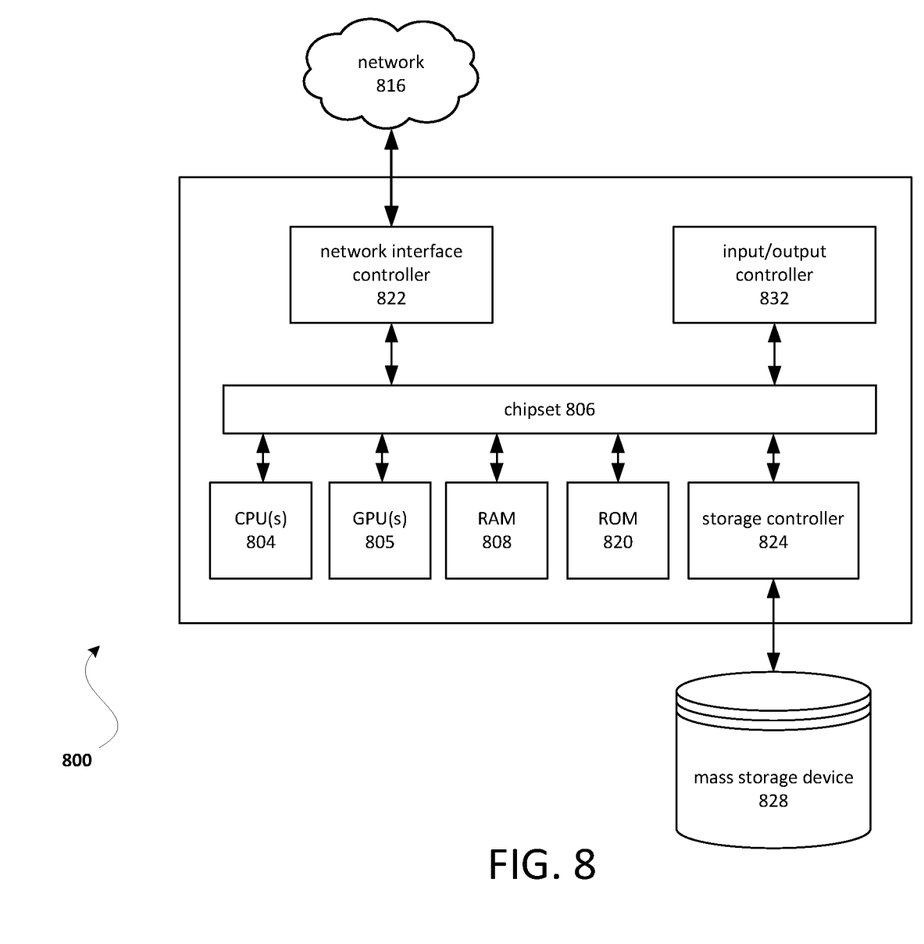
FIG. 8 shows an example computing device which may be used to perform any of the techniques disclosed herein.

FIG. 8 illustrates a computing device that may be used in various aspects, such as the services, networks, modules, and/or devices depicted in FIG. 1. With regard to the example architecture of FIG. 1, data certificate provider(s) 102, advertiser(s) 104, token manager(s) 106, advertisement advisor(s) 108, publisher system(s) 110, a plurality of user devices 114*a-n*, and broker(s) 112 may each be implemented by one or more instance of a computing device 800 of FIG. 8. The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 805. The GPU(s) 805 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random-access memory (RAM) 808 used as the main memory in the computing device 800. The chipset 806 may further provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN). The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. The mass storage device 828 may comprise a management component 810. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on the mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 828 by detecting the physical states or characteristics of one or more particular locations within the physical storage units.

In addition to the mass storage device 828 described above, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described above. The computing device 800 may have access to computer-readable storage media storing computer-executable instructions, which, when executed by the computing device 800, may perform the methods described herein.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of anonymizing user behavior data and creating a secure environment, comprising:
    generating user behavior data by a computing device accessing data sources, wherein the computing device is associated with a user, and wherein the user behavior data is verified by an authentication certificate from the data sources;
    processing the user behavior data by the computing device through a data obfuscation process, wherein the data obfuscation process comprises removing partial information from the user behavior data and categorizing the user behavior data into pre-defined categories;
    generating, by the computing device, a token from the processed user behavior data, wherein the token comprises tokenized and anonymized user behavior data, wherein a value of the token is determined based at least in part on the data obfuscation process, and wherein the token is certified by a data certification service;
    associating, by the computing device, the token with a token manager account;
    registering, by the computing device, the token by providing the token manager account and providing a hash key of the token without revealing details of the token to a decentralized broker service, wherein the decentralized broker service is configured to process advertising requests received from advertisers, the decentralized broker service is configured to request advertisements suggested by at least one advertisement suggestion service, and the decentralized broker service is configured to provide at least one subset of the advertisements to at least one publisher service;
    transmitting, by the computing device, the token to an independent token manager for storage, wherein the token is associated with the token manager account, and wherein the stored token is accessible by the at least one advertisement suggestion service for use in suggesting the advertisements;
    claiming, by the computing device, an ownership of the token when interacting with the at least one publisher service; and
    verifying, by the computing device, the ownership of the token using a private key of the computing device after the at least one publisher service plays at least one advertisement associated with the token, wherein the at least one advertisement is among the at least one subset of the advertisements, and wherein information indicating a verification of the ownership is collected by the at least one publisher service.

2. The method of claim 1, the registering the token further comprising:
    creating a transaction based at least in part on inputting the token manager account.

3. The method of claim 1, wherein a token registry is generated based on the registering the token, and wherein the token registry comprises information indicative of distributing advertising payment among the user, the decentralized broker service, the at least one advertisement suggestion service, the independent token manager, and the least one publisher service.

4. The method of claim 1, wherein each of the advertising requests comprises information indicative of a predefined target user group and an amount of digital currency for payment.

5. The method of claim 1, wherein the at least one independent advisor is registered to be associated with the token, the at least one advertisement suggestion service is configured to obtain the token from the independent token manager and train its system of suggesting advertisements using the token, and the at least one advertisement suggestion service is configured to monitor transactions associated with the token.

6. The method of claim 1, wherein the independent token manager is configured to provide a secure storage and query service for tokenized user data, and the independent token manager is configured to provide anonymous user data to the at least one advertisement suggestion service.

7. A system of anonymizing user behavior data and creating a secure environment, comprising:
    at least one processor; and
    at least one memory communicatively coupled to the at least one processor and comprising computer-readable instructions that upon execution by the at least one processor cause the at least one processor to perform operations comprising:
    generating user behavior data by a computing device accessing data sources, wherein the computing device is associated with a user, and wherein the user behavior data is verified by an authentication certificate from the data sources;
    processing the user behavior data by the computing device through a data obfuscation process, wherein the data obfuscation process comprises removing partial information from the user behavior data and categorizing the user behavior data into pre-defined categories;
    generating, by the computing device, a token from the processed user behavior data, wherein the token comprises tokenized and anonymized user behavior data, wherein a value of the token is determined based at least in part on the data obfuscation process, and wherein the token is certified by a data certification service;
    associating, by the computing device, the token with a token manager account;
    registering, by the computing device, the token by providing the token manager account and providing a hash key of the token without revealing details of the token to a decentralized broker service, wherein the decentralized broker service is configured to process advertising requests received from advertisers, the decentralized broker service is configured to request advertisements suggested by at least one advertisement suggestion service, and the decentralized broker service is configured to provide at least one subset of the advertisements to at least one publisher service;

transmitting, by the computing device, the token to an independent token manager for storage, wherein the token is associated with the token manager account, and wherein the stored token is accessible by the at least one advertisement suggestion service for use in suggesting the advertisements;

claiming, by the computing device, an ownership of the token when interacting with the at least one publisher service; and verifying, by the computing device, the ownership of the token using a private key of the computing device after the at least one publisher service plays at least one advertisement associated with the token, wherein the at least one advertisement is among the at least one subset of the advertisements, and wherein information indicating a verification of the ownership is collected by the at least one publisher service.

8. The system of claim 7, wherein a token registry is generated based on the registering the token, and wherein the token registry comprises information indicative of distributing advertising payment among the user, the decentralized broker service, the at least one independent advisor, the independent token manager, and the least one publisher.

9. The system of claim 7, wherein the at least one independent advisor is registered to be associated with the token, the at least one advertisement suggestion service is configured to obtain the token from the independent token manager and train its system of suggesting advertisements using the token, and the at least one advertisement suggestion service is configured to monitor transactions associated with the token.

10. The system of claim 7, wherein the independent token manager is configured to provide a secure storage and query service for tokenized user data, and the independent token manager is configured to provide anonymous user data to the at least one independent advisor advertisement suggestion service.

11. A non-transitory computer-readable storage medium, storing computer-readable instructions that upon execution by a processor cause the processor to implement operations for anonymizing user behavior data and creating a secure environment, the operations comprising:

generating user behavior data by a computing device accessing data sources, wherein the computing device is associated with a user, and wherein the user behavior data is verified by an authentication certificate from the data sources;

processing the user behavior data by the computing device through a data obfuscation process, wherein the data obfuscation process comprises removing partial information from the user behavior data and categorizing the user behavior data into pre-defined categories;

generating, by the computing device, a token from the processed user behavior data, wherein the token comprises tokenized and anonymized user behavior data, wherein a value of the token is determined based at least in part on the data obfuscation process, and wherein the token is certified by a data certification service;

associating, by the computing device, the token with a token manager account;

registering, by the computing device, the token by providing the token manager account and providing a hash key of the token without revealing details of the token to a decentralized broker service, wherein the decentralized broker service is configured to process advertising requests received from advertisers, the decentralized broker service is configured to request advertisements suggested by at least one advertisement suggestion service, and the decentralized broker service is configured to provide at least one subset of the advertisements to at least one publisher service;

transmitting, by the computing device, the token to an independent token manager for storage, wherein the token is associated with the token manager account, and wherein the stored token is accessible by the at least one advertisement suggestion service for use in suggesting the advertisements;

claiming, by the computing device, an ownership of the token when interacting with the at least one publisher service; and verifying, by the computing device, the ownership of the token using a private key of the computing device after the at least one publisher service plays at least one advertisement associated with the token, wherein the at least one advertisement is among the at least one subset of the advertisements, and wherein information indicating a verification of the ownership is collected by the at least one publisher service.

12. The non-transitory computer-readable storage medium of claim 11, wherein a token registry is generated based on the registering the token, and wherein the token registry comprises information indicative of distributing advertising payment among the user, the decentralized broker service, the at least one advertisement suggestion service, the independent token manager, and the least one publisher service.

* * * * *